(12) United States Patent
Flemming et al.

(10) Patent No.: US 11,422,550 B2
(45) Date of Patent: Aug. 23, 2022

(54) SOLAR POWERED COOLER ASSEMBLY

(71) Applicants: Roger Flemming, San Antonio, TX (US); Connie Conley, San Antonio, TX (US)

(72) Inventors: Roger Flemming, San Antonio, TX (US); Connie Conley, San Antonio, TX (US)

( * ) Notice: Subject to any disclaimer, the term of this patent is extended or adjusted under 35 U.S.C. 154(b) by 292 days.

(21) Appl. No.: 16/863,654

(22) Filed: Apr. 30, 2020

(65) Prior Publication Data
US 2021/0341914 A1 Nov. 4, 2021

(51) Int. Cl.
G05D 1/00 (2006.01)
B60L 8/00 (2006.01)
B65D 81/38 (2006.01)
B60K 1/02 (2006.01)
B62D 55/08 (2006.01)
H02J 7/35 (2006.01)
H02S 10/40 (2014.01)
H02S 20/32 (2014.01)
H02S 40/38 (2014.01)
B65D 81/18 (2006.01)

(52) U.S. Cl.
CPC ............. *G05D 1/0016* (2013.01); *B60K 1/02* (2013.01); *B60L 8/003* (2013.01); *B62D 55/08* (2013.01); *B65D 81/18* (2013.01); *B65D 81/3825* (2013.01); *H02J 7/35* (2013.01); *H02S 10/40* (2014.12); *H02S 20/32* (2014.12); *H02S 40/38* (2014.12)

(58) Field of Classification Search
CPC ........ G05D 1/00; G05D 1/0016; H02S 10/40; H02S 20/32; H02S 40/38; B60K 1/02; B60L 8/00; B60L 8/003; B62D 55/08; B65D 81/18; B65D 81/3825; B65D 81/38; H02J 7/35
See application file for complete search history.

(56) References Cited

U.S. PATENT DOCUMENTS

| 6,502,656 | B2 | 1/2003 | Weiss |
| 7,798,886 | B1 | 9/2010 | Williamson |
| D660,885 | S | 5/2012 | Crawford |
| 8,327,963 | B1 | 12/2012 | Faulkingham |
| 10,071,303 | B2 | 9/2018 | Pikulski |
| 2005/0029030 | A1 | 2/2005 | Ewert |

FOREIGN PATENT DOCUMENTS

WO  WO2017019038  2/2017

*Primary Examiner* — Robert L Deberadinis

(57) ABSTRACT

A solar powered cooler assembly includes track drive that is drivable over a support surface. The track drive includes a pair of tracks that is each drivable in a forward direction or a rearward direction. Each of the tracks is drivable independently of one another for steering the track drive and facilitating the track drive to have a zero turning radius. A cooler is mounted to the track drive for transporting the cooler over the support surface. A personal electronic device is in wireless communication with the track drive for remotely controlling the track drive. In this way the personal electronic device facilitates the user to drive the track drive.

9 Claims, 5 Drawing Sheets

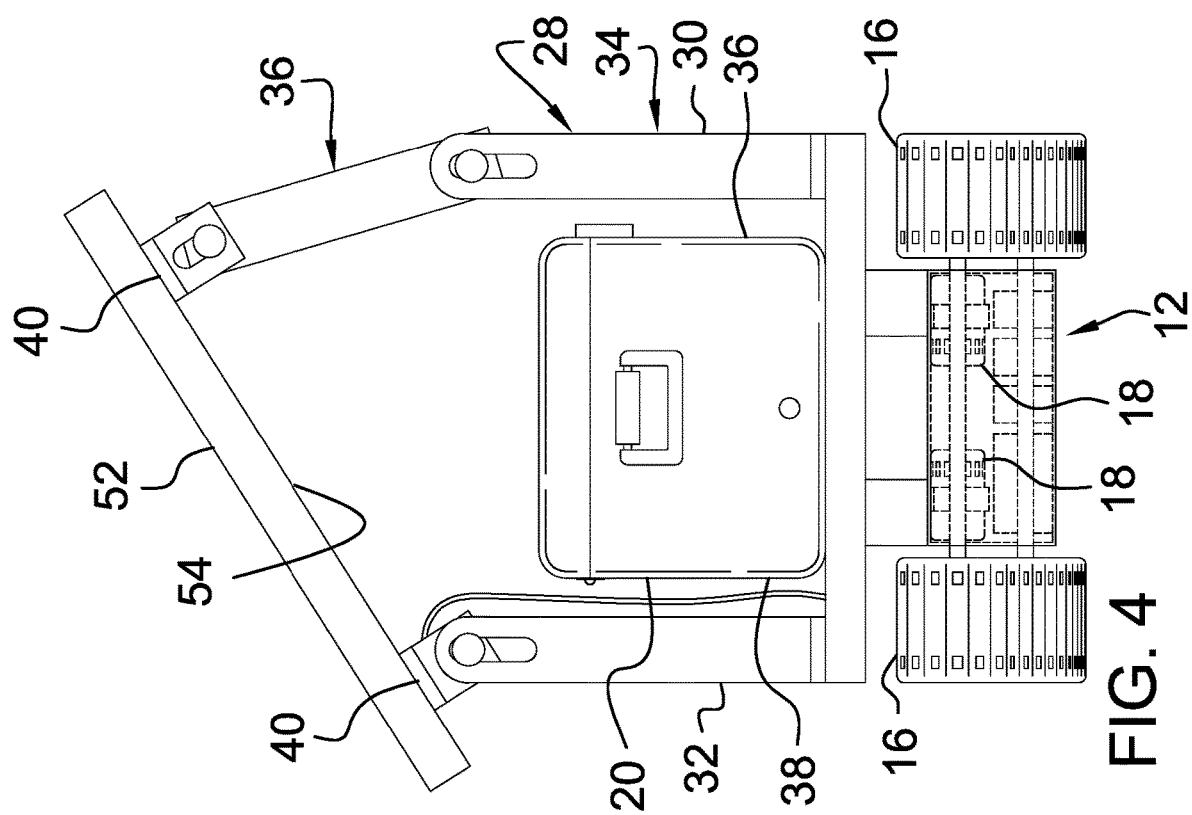
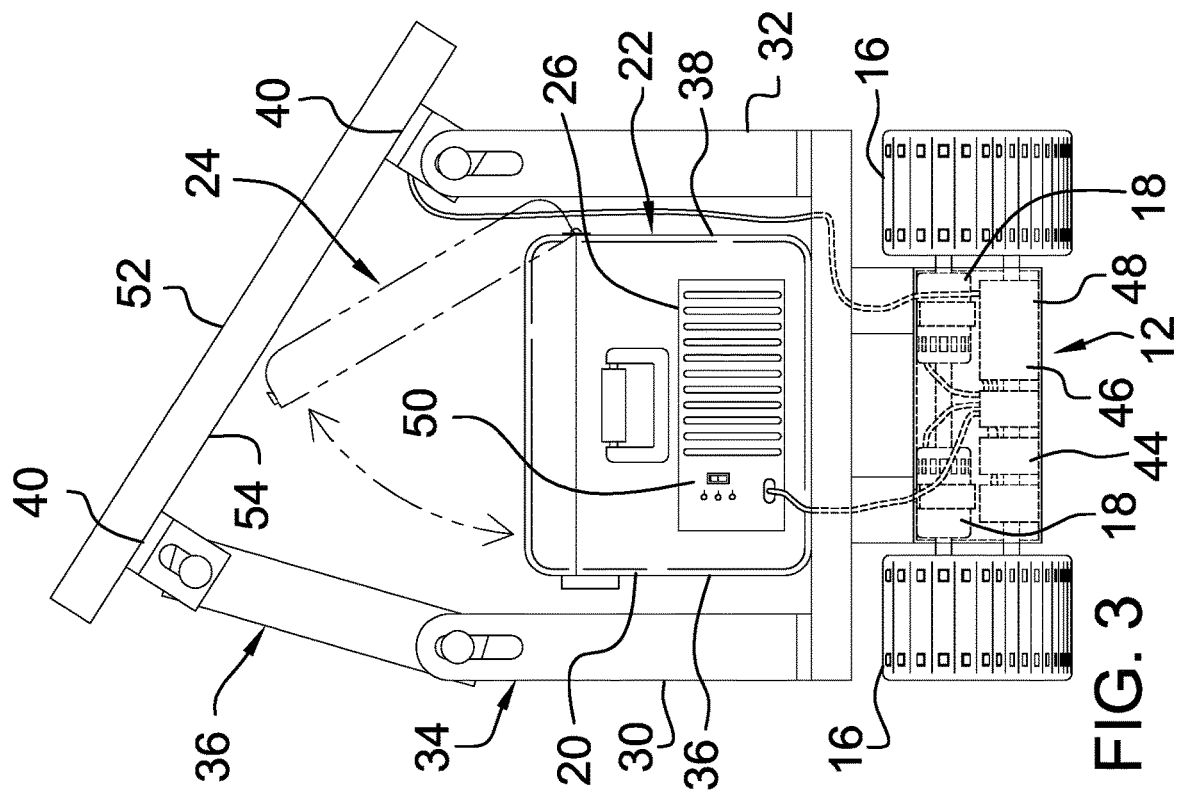

SOLAR POWERED COOLER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to cooler devices and more particularly pertains to a new cooler device for cooling and transporting perishable food items and/or beverages.

(2) Description of Related Art Including Information Disclosed Under 37 CFR 1.97 and 1.98

The prior art relates to cooler devices including a cooler with powered wheels for driving the cooler over a support surface. The prior art also discloses a cooler mounted to a track drive that is remotely controlled. The prior art further discloses a track drive that includes a storage bed for transporting objects. The prior art also discloses a cart that includes a pair of tracks and a pull handle. The prior art also discloses a cooler that has drive wheels and a remote control for driving the cooler.

BRIEF SUMMARY OF THE INVENTION

An embodiment of the disclosure meets the needs presented above by generally comprising a track drive that is drivable over a support surface. The track drive includes a pair of tracks that is each drivable in a forward direction or a rearward direction. Each of the tracks is drivable independently of one another for steering the track drive and facilitating the track drive to have a zero turning radius. A cooler is mounted to the track drive for transporting the cooler over the support surface. A personal electronic device is in wireless communication with the track drive for remotely controlling the track drive. In this way the personal electronic device facilitates the user to drive the track drive.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a back view of an embodiment of the disclosure.

FIG. 4 is a front view of an embodiment of the disclosure.

DETAILED DESCRIPTION OF THE INVENTION

Figure 1:
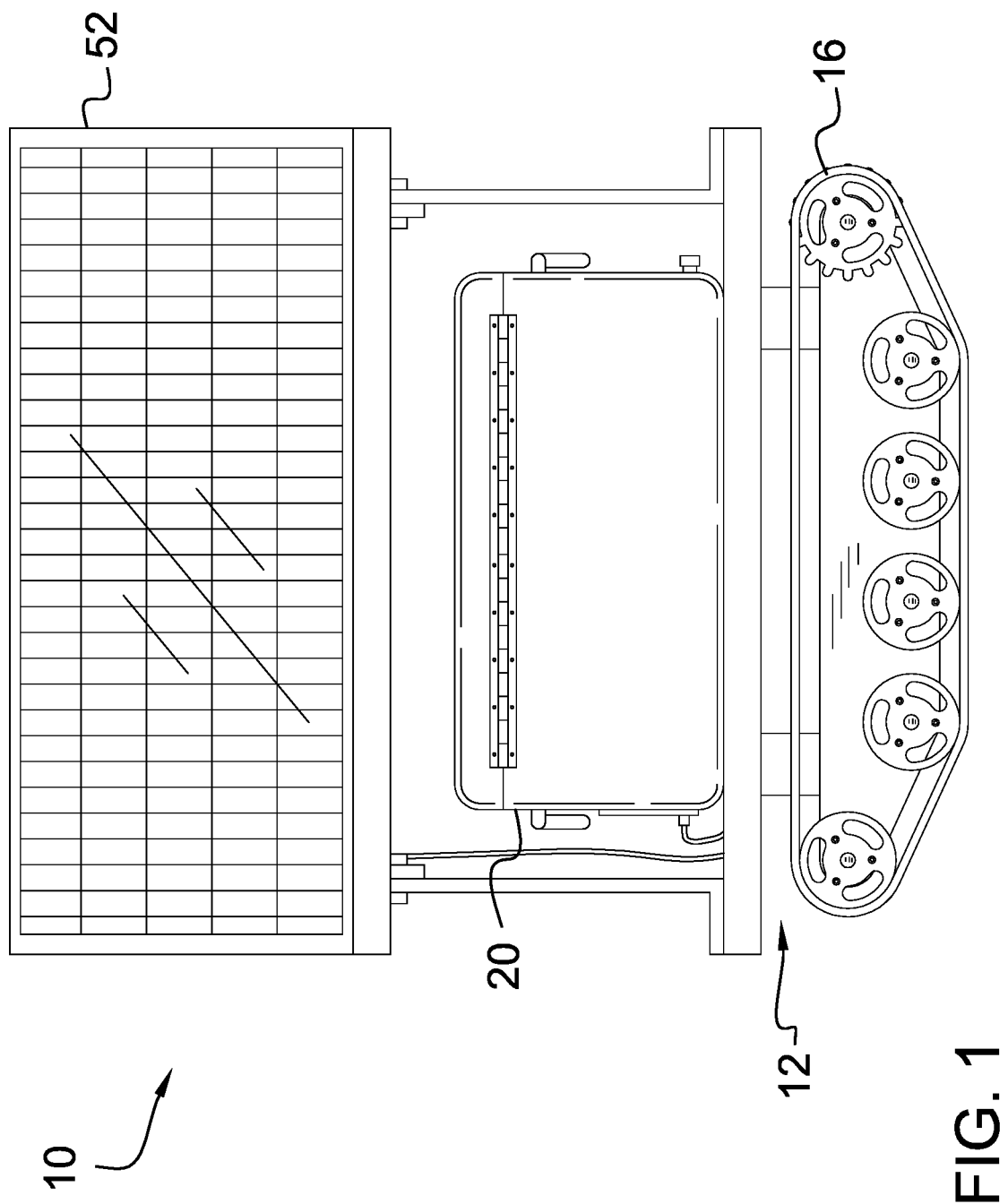
FIG. 1 is a right side view of a solar powered cooler assembly according to an embodiment of the disclosure.
Figure 2:
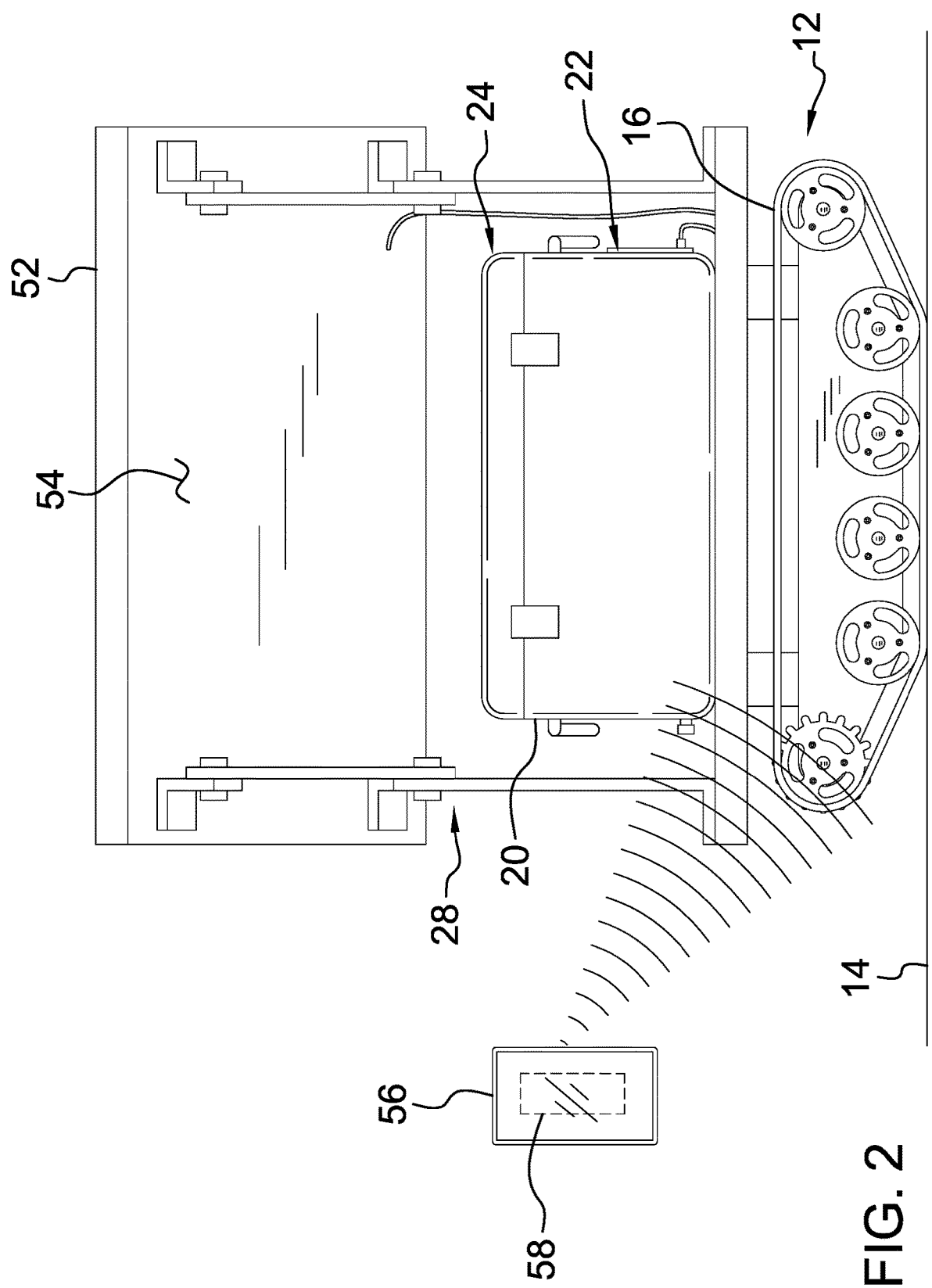
FIG. 2 is a left view of an embodiment of the disclosure.
Figure 5:
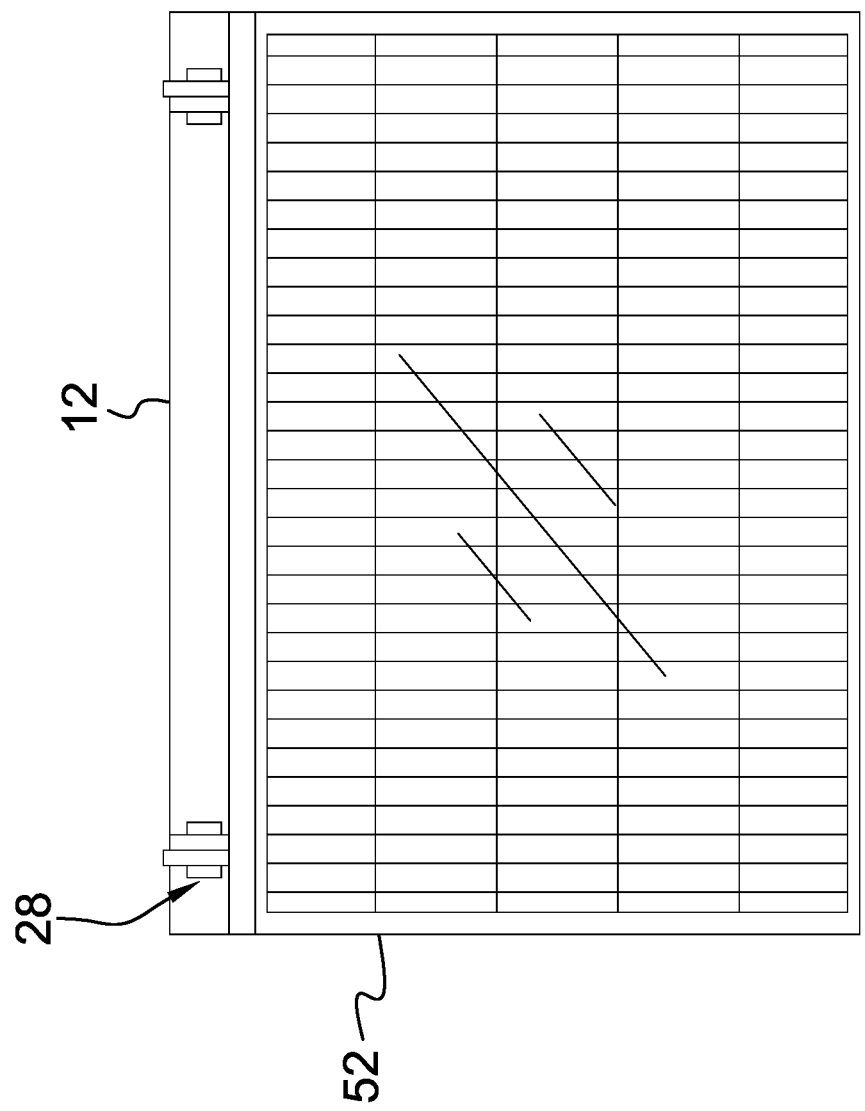
FIG. 5 is a top view of an embodiment of the disclosure.
Figure 6:
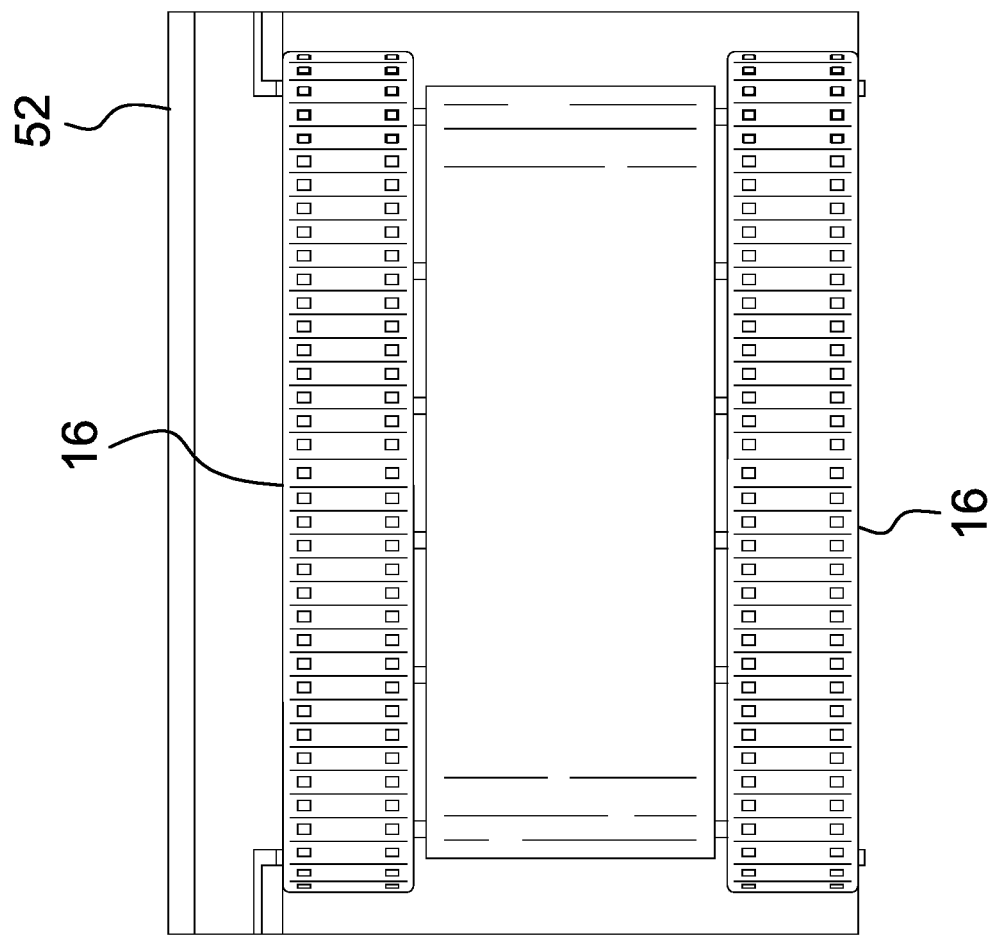
FIG. 6 is a bottom view of an embodiment of the disclosure.

With reference now to the drawings, and in particular to FIGS. 1 through 6 thereof, a new cooler device embodying the principles and concepts of an embodiment of the disclosure and generally designated by the reference numeral 10 will be described.

As best illustrated in FIGS. 1 through 6, the solar powered cooler assembly 10 generally comprises a track drive 12 that is drivable over a support surface 14. The track drive 12 includes a pair of tracks 16 that is each drivable in a forward direction or a rearward direction. In this way the track drive 12 can be driven forwardly or rearwardly. Each of the tracks 16 is drivable independently of one another for steering the track drive 12 and facilitating the track drive 12 to have a zero turning radius. The track drive 12 includes a pair of drive motors 18 that is each in mechanical communication with a respective one of the tracks 16. Each of the drive motors 18 may comprise an electric motor or the like and the track drive 12 may have a top speed of approximately 3.0 miles per hour.

A cooler 20 is provided and the cooler 20 is mounted to the track drive 12 to transport the cooler 20 over the support surface 14. The cooler 20 is comprised of a thermally insulating material to store perishable food items and/or beverages. The cooler 20 has a chest 22 and a lid 24 that is hingedly coupled to the chest 22. The cooler 20 includes an electronic cooling unit 26 that is integrated therein and the electronic cooling unit 26 cools an interior of the cooler 20 when the electronic cooling unit 26 is turned on. In this way the perishable food items can be kept cold without the use of ice as is common with traditional coolers. Moreover, the electronic cooler 20 may include a compressor, an evaporator, a pump and other components that are common to refrigeration units. The cooler 20 may have an internal capacity ranging between approximately 60.0 quarts to 100.0 quarts.

A solar panel mount 28 is coupled to and extends upwardly from the track drive 12 and the solar panel mount 28 is tiltable about a horizontal axis. The solar panel mount 28 comprises a pair of first members 30 and a pair of second members 32. Each of the first members 30 and the second members 32 comprise a first portion 34 that is movably coupled to a second portion 36 such that each of the first members 30 and the second members 32 has a telescopically adjustable length. The first portion 34 of each of the first members 30 and the second members 32 is coupled to and extends upwardly from a top side of the track drive 12 having the first portion 34 being vertically oriented.

The second portion 36 is positionable at a plurality of angles with respect to the first portion 34. The first portion 34 of each of the first members 30 is positioned adjacent to a front side 36 of the cooler 20. Conversely, the first portion 34 of each of the second members 32 is positioned adjacent to a back side 38 of the cooler 20. The second portion 36 of each of the first members 30 and the second members 32 has a distal end 40.

A control circuit 42 is coupled to the track drive 12 and the control circuit 42 is electrically coupled to each of the drive motors 18 associated with the track drive 12. Additionally, the control circuit 42 is electrically coupled to the electronic cooling unit 26. A receiver 44 is coupled to the track drive 12 and the receiver 44 is electrically coupled to the control circuit 42. The receiver 44 may comprise a radio frequency receiver or the like and the receiver 44 may employ Bluetooth communication protocols.

A power supply 46 is coupled to the track drive 12 and the power supply 46 is electrically coupled to the track drive 12 and the cooler 20. The power supply 46 comprises at least one rechargeable battery 48 and the at least one rechargeable battery 48 is electrically coupled to the control circuit 42. A control panel 50 is coupled to the cooler 20 such that the control panel 50 is accessible to a user. The control panel 50 is electrically coupled to the electronic cooling unit 26 for turning the electronic cooling unit 26 on and off, as well as adjusting the temperature range of the electronic cooling unit 26.

A solar panel 52 is provided, the solar panel 52 is coupled to the solar panel mount 28 and the solar panel 52 is exposed to sunlight. The solar panel 52 is electrically coupled to the at least one rechargeable battery 48 for charging the at least one rechargeable battery 48. Moreover, a bottom surface 54 of the solar panel 52 is coupled to the distal end 40 of the second portion 36 of each of the first members 30 and the second members 32 such that the solar panel 52 is positioned above the cooler 20. Additionally, the solar panel 52 is tiltable to a plurality of angles to facilitate the solar panel 52 to be pointed toward the sun at all hours of the day.

A personal electronic device 56 is included that is carried by a user. The personal electronic device 56 is in wireless communication with the track drive 12 for remotely controlling the track drive 12. In this way the personal electronic device 56 facilitates the user to drive the track drive 12. The personal electronic device 56 includes a transceiver 58 is in wireless communication with the receiver 44. Moreover, the personal electronic device 56 may comprise a smart phone or the like and the personal electronic device 56 may store operational software, such as a smart phone app or the like.

In use, the perishable food items and/or beverages are placed in the cooler 20 and the electronic cooling unit 26 is turned on the keep the perishable food items and/or beverages chilled. The personal electronic device 56 is manipulated to remotely drive the track drive 12 unit to a desired location. In this way the perishable food items and/or beverages can be transported without being carried by the user. Additionally, the solar panel 52 continuously charges the at least one rechargeable battery 48 for extended battery 48 life.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A solar powered cooler assembly for transporting and cooling food items, said assembly comprising:
   a track drive being drivable over a support surface, said track drive including a pair of tracks, each of said tracks being drivable in a forward direction or a rearward direction thereby facilitating said track drive to be driven forwardly or rearwardly, each of said tracks being drivable independently of one another for steering said track drive and facilitating said track drive to have a zero turning radius;
   a cooler being mounted to said track drive wherein said track drive is configured to transport said cooler over the support surface, said cooler being comprised of a thermally insulating material wherein said cooler is configured to store perishable food items;
   a solar panel mount being coupled to and extending upwardly from said track drive, said solar panel mount being tiltable about a horizontal axis;
   a solar panel being coupled to said solar panel mount wherein said solar panel is configured to be exposed to sunlight, said solar panel being electrically coupled to said track drive and said cooler for supplying electrical power to said track drive and said cooler; and
   a personal electronic device being carried by a user, said personal electronic device being in wireless communication with said track drive for remotely controlling said track drive wherein said personal electronic device is configured to facilitate the user to drive said track drive.

2. The assembly according to claim 1, wherein said cooler has a chest and a lid being hingedly coupled to said chest, said cooler including an electronic cooling unit being integrated therein, said electronic cooling unit cooling an interior of said cooler when said electronic cooling unit is turned on.

3. The assembly according to claim 1, wherein said solar panel mount comprises a pair of first members and a pair of second members, each of said first members and said second members comprising a first portion being movably coupled to a second portion such that each of said first members and said second members has a telescopically adjustable length, said first portion of each of said first members and said second members being coupled to and extending upwardly from a top side of said track drive having said first portion being vertically oriented, said second portion being positionable at a plurality of angles with respect to said first portion.

4. The assembly according to claim 3, wherein:
said first portion of each of said first members is positioned adjacent to a front side of said cooler;
said first portion of each of said second members is positioned adjacent to a back side of said cooler; and
said second portion of each of said first members and said second members has a distal end.

5. The assembly according to claim 2, wherein:
said track drive includes a pair of drive motors each being in mechanical communication with a respective one of said tracks;
said assembly includes a control circuit being coupled to said track drive, said control circuit being electrically coupled to each of said motors associated with said track drive, said control circuit being electrically coupled to said electronic cooling unit; and
a receiver being coupled to said track drive, said receiver being electrically coupled to said control circuit.

6. The assembly according to claim 5, further comprising a power supply being coupled to said track drive, said power supply being electrically coupled to said track drive and said cooler, said power supply comprising at least one rechargeable battery, said at least one rechargeable battery being electrically coupled to said control circuit.

7. The assembly according to claim 6, wherein solar panel is electrically coupled to said at least one rechargeable battery for charging said at least one rechargeable battery.

8. The assembly according to claim 4, wherein a bottom surface of said solar panel is coupled to said distal end of said second portion of each of said first members and said second members such that said solar panel is positioned above said cooler, said solar panel being tiltable to a plurality of angles wherein said solar panel is configured to be pointed toward the sun at all hours of the day.

9. A solar powered cooler assembly for transporting and cooling food items, said assembly comprising:
a track drive being drivable over a support surface, said track drive including a pair of tracks, each of said tracks being drivable in a forward direction or a rearward direction thereby facilitating said track drive to be driven forwardly or rearwardly, each of said tracks being drivable independently of one another for steering said track drive and facilitating said track drive to have a zero turning radius, said track drive including a pair of drive motors each being in mechanical communication with a respective one of said tracks;
a cooler being mounted to said track drive wherein said track drive is configured to transport said cooler over the support surface, said cooler being comprised of a thermally insulating material wherein said cooler is configured to store perishable food items, said cooler having a chest and a lid being hingedly coupled to said chest, said cooler including an electronic cooling unit being integrated therein, said electronic cooling unit cooling an interior of said cooler when said electronic cooling unit is turned on;
a solar panel mount being coupled to and extending upwardly from said track drive, said solar panel mount being tiltable about a horizontal axis, said solar panel mount comprising a pair of first members and a pair of second members, each of said first members and said second members comprising a first portion being movably coupled to a second portion such that each of said first members and said second members has a telescopically adjustable length, said first portion of each of said first members and said second members being coupled to and extending upwardly from a top side of said track drive having said first portion being vertically oriented, said second portion being positionable at a plurality of angles with respect to said first portion, said first portion of each of said first members being positioned adjacent to a front side of said cooler, said first portion of each of said second members being positioned adjacent to a back side of said cooler, said second portion of each of said first members and said second members having a distal end;
a control circuit being coupled to said track drive, said control circuit being electrically coupled to each of said motors associated with said track drive, said control circuit being electrically coupled to said electronic cooling unit;
a receiver being coupled to said track drive, said receiver being electrically coupled to said control circuit;
a power supply being coupled to said track drive, said power supply being electrically coupled to said track drive and said cooler, said power supply comprising at least one rechargeable battery, said at least one rechargeable battery being electrically coupled to said control circuit;
a solar panel being coupled to said solar panel mount wherein said solar panel is configured to be exposed to sunlight, said solar panel being electrically coupled to said at least one rechargeable battery for charging said at least one rechargeable battery, a bottom surface of said solar panel being coupled to said distal end of said second portion of each of said first members and said second members such that said solar panel is positioned above said cooler, said solar panel being tiltable to a plurality of angles wherein said solar panel is configured to be pointed toward the sun at all hours of the day; and
a personal electronic device being carried by a user, said personal electronic device being in wireless communication with said track drive for remotely controlling said track drive wherein said personal electronic device is configured to facilitate the user to drive said track drive, said personal electronic device including a transceiver being in wireless communication with said receiver.

* * * * *